US011506178B2

(12) United States Patent
Marcel et al.

(10) Patent No.: US 11,506,178 B2
(45) Date of Patent: Nov. 22, 2022

(54) FRICTION LIMITING TURBINE GENERATOR GYROSCOPE METHOD AND APPARATUS

(71) Applicant: Airborne Motor Works Inc., Veradale, WA (US)

(72) Inventors: Jesse Antoine Marcel, Veradale, WA (US); Jeffrey Scott Chimenti, The Woodlands, TX (US)

(73) Assignee: Airborne Motor Works Inc., Veradale, WA (US)

( * ) Notice: Subject to any disclaimer, the term of this patent is extended or adjusted under 35 U.S.C. 154(b) by 0 days.

(21) Appl. No.: 17/187,869

(22) Filed: Feb. 28, 2021

(65) Prior Publication Data
US 2021/0277870 A1    Sep. 9, 2021

Related U.S. Application Data

(60) Provisional application No. 62/983,547, filed on Feb. 28, 2020.

(51) Int. Cl.
*F03D 9/00* (2016.01)
*F03D 9/25* (2016.01)
(Continued)

(52) U.S. Cl.
CPC ............. *F03D 9/25* (2016.05); *F03D 7/0236* (2013.01); *F03D 7/04* (2013.01); *F03D 80/70* (2016.05);
(Continued)

(58) Field of Classification Search
CPC . F03D 9/25; F03D 7/0236; F03D 7/04; F03D 80/70; F03D 1/0666; F03D 7/022;
(Continued)

(56) References Cited

U.S. PATENT DOCUMENTS

| 3,265,329 A | 8/1966 | Postelson |
| 3,327,538 A | 6/1967 | Krupick et al. |

(Continued)

FOREIGN PATENT DOCUMENTS

| CN | 104980001 | 10/2015 |
| JP | 3029792 | 2/2000 |

(Continued)

OTHER PUBLICATIONS

International Search Report and Written Opinion of the International Searching Authority dated Jun. 10, 2021, in International Patent Application No. PCT/US21/20174, 8 pages.

(Continued)

*Primary Examiner* — Julio C. Gonzalez
(74) *Attorney, Agent, or Firm* — Lowe Graham Jones PLLC

(57) ABSTRACT

A friction limiting turbine gyroscope is a compact and efficient means to convert the energy of a moving fluid into electrical energy. The gyroscope's flywheel rotates when a fluid passes through its spokes while magnets located along the perimeter act upon proximate movable field coils to produce electricity. The spokes of the flywheel are optimized for the flow and density of the fluid with the ability to trans mutate using shaped memory alloys as well as rotate about their center of pressure allowing the flywheel to capture more of the energy from the fluid passing over their surfaces in all conditions. Mechanical energy losses are reduced because of the inherent stabilizing effects created by the gyroscope. Because of the stabilization, a magnetic bearing field effectively supports the gyroscope eliminating mechanical interference in rotation.

6 Claims, 4 Drawing Sheets

(51) Int. Cl.
*F03D 7/02* (2006.01)
*H02K 7/18* (2006.01)
*F03D 80/70* (2016.01)
*F03D 7/04* (2006.01)

(52) U.S. Cl.
CPC ...... *H02K 7/1823* (2013.01); *F05B 2240/511* (2013.01); *F05B 2260/305* (2013.01); *F05B 2270/101* (2013.01)

(58) Field of Classification Search
CPC .......... F05B 2240/511; F05B 2260/305; F05B 2270/101; F05B 2240/33; H02K 7/1823; H02K 7/14; H02K 7/1869
See application file for complete search history.

(56) References Cited

U.S. PATENT DOCUMENTS

| | | | |
|---|---|---|---|
| 3,396,391 A | | 8/1968 | Anderson et al. |
| 3,845,995 A | | 11/1974 | Wehde |
| 3,991,487 A | | 11/1976 | Bede |
| 4,459,087 A | * | 7/1984 | Barge ........................ F01P 5/04 |
| | | | 417/356 |
| 4,720,640 A | * | 1/1988 | Anderson ............... F03D 13/20 |
| | | | 290/43 |
| 4,953,811 A | | 9/1990 | Smith |
| 5,454,531 A | | 10/1995 | Melkuti |
| 5,514,923 A | | 5/1996 | Gossler et al. |
| 5,925,952 A | | 7/1999 | Bichler et al. |
| 6,270,038 B1 | | 8/2001 | Cycon et al. |
| 6,431,494 B1 | | 8/2002 | Kinkead et al. |
| 6,465,902 B1 | * | 10/2002 | Beauchamp .......... F03D 7/0224 |
| | | | 290/55 |
| 6,919,663 B2 | | 7/2005 | Iles-Klumpner |
| 7,032,861 B2 | | 4/2006 | Sanders, Jr. et al. |
| 7,152,301 B2 | | 12/2006 | Rittmeyer |
| 7,825,554 B2 | | 11/2010 | Bastian, II et al. |
| 7,874,513 B1 | | 1/2011 | Smith |
| 8,083,557 B2 | | 12/2011 | Sullivan |
| 8,752,787 B2 | | 6/2014 | Ruan et al. |
| 8,761,961 B2 | | 6/2014 | Lee et al. |
| 9,649,242 B2 | | 5/2017 | Chiu et al. |
| 10,040,544 B2 | | 8/2018 | Marcel |
| 10,144,507 B2 | | 12/2018 | Chretien |
| 10,676,180 B2 | | 6/2020 | Marcel |
| 2003/0085319 A1 | | 5/2003 | Wagner et al. |
| 2004/0020185 A1 | | 2/2004 | Brouillette et al. |
| 2004/0094662 A1 | | 5/2004 | Sanders, Jr. et al. |
| 2005/0269889 A1 | | 12/2005 | Tessier et al. |
| 2006/0016929 A1 | | 1/2006 | Mohr |
| 2006/0049304 A1 | | 3/2006 | Sanders, Jr. et al. |
| 2007/0188906 A1 | | 8/2007 | Ho et al. |
| 2008/0042504 A1 | | 2/2008 | Thibodeau et al. |
| 2010/0001143 A1 | | 1/2010 | Bojiuc |
| 2010/0090440 A1 | | 4/2010 | Reichstetter et al. |
| 2010/0307290 A1 | | 12/2010 | Porfiropoulos |
| 2011/0178711 A1 | | 7/2011 | Christoph |
| 2012/0056040 A1 | | 3/2012 | Brotherton-Ratcliffe et al. |
| 2012/0112461 A1 | * | 5/2012 | Saluccio .................. F03D 9/25 |
| | | | 290/50 |
| 2013/0020429 A1 | | 1/2013 | Kroo |
| 2015/0149000 A1 | | 5/2015 | Rischmuller et al. |
| 2015/0188400 A1 | | 7/2015 | Kemp et al. |
| 2015/0209212 A1 | | 7/2015 | Duguid |
| 2015/0226086 A1 | | 8/2015 | Samuelson |
| 2016/0008206 A1 | | 1/2016 | Devanaboyina |
| 2016/0152327 A1 | | 6/2016 | Bertels |
| 2016/0207625 A1 | | 7/2016 | Judas et al. |
| 2017/0073065 A1 | | 3/2017 | Von Novak et al. |
| 2017/0104385 A1 | | 4/2017 | Salamon et al. |
| 2017/0320598 A1 | | 11/2017 | Bushroe |
| 2017/0335821 A1 | | 11/2017 | Ohya et al. |
| 2017/0361930 A1 | | 12/2017 | Choi et al. |
| 2019/0300165 A1 | | 10/2019 | Marcel et al. |
| 2020/0140102 A1 | | 5/2020 | Marcel et al. |
| 2020/0230013 A1 | | 7/2020 | Marcel et al. |

FOREIGN PATENT DOCUMENTS

| | | |
|---|---|---|
| RU | 2321765 | 4/2008 |
| RU | 2527248 | 8/2014 |
| RU | 2538737 | 1/2015 |
| SU | 1211449 | 2/1986 |
| WO | 2009/093181 | 7/2009 |
| WO | 2016/153580 | 9/2016 |
| WO | 2019/086293 | 5/2019 |
| WO | 2020023977 | 1/2020 |

OTHER PUBLICATIONS

International Preliminary Report on Patentability dated Oct. 8, 2020, in International Patent Application No. PCT/US19/24696, 6 pages.
International Search Report and Written Opinion of the International Searching Authority completed Aug. 28, 2016, in International Patent Application No. PCT/US16/12073, 12 pages.
International Search Report and Written Opinion of the International Searching Authority completed Jul. 12, 2019, in International Patent Application No. PCT/US19/24696, 6 pages.
International Search Report and Written Opinion of the International Searching Authority completed Oct. 30, 2019, in International Patent Application No. PCT/US19/43995, 6 pages.
International Search Report and Written Opinion of the International Searching Authority completed May 12, 2020, in International Patent Application No. PCT/US2019/048191, 7 pages.
International Search Report and Written Opinion of the International Searching Authority completed Apr. 17, 2020, in International Patent Application No. PCT/US2020/014491, 7 pages.
International Search Report and Written Opinion of the International Searching Authority completed Jun. 8, 2020, in International Patent Application No. PCT/US20/23676, 9 pages.

* cited by examiner

FRICTION LIMITING TURBINE GENERATOR GYROSCOPE METHOD AND APPARATUS

PRIORITY CLAIM

This application claims priority from U.S. Provisional Patent Application No. 62/983,547 filed Feb. 28, 2020, the contents of which is incorporated herein by reference in its entirety.

FIELD OF THE INVENTION

The invention relates to the field of electric propulsion systems used for propelling vertical takeoff and landing (VTOL) or very short takeoff and landing (VSTOL) air vehicles. More specifically, the invention comprises a friction limiting turbine gyroscope that is a compact and efficient means to convert the energy of a moving fluid into electrical energy for use in powering VTOL/VSTOL aircraft.

BACKGROUND OF THE INVENTION

Turbine generators convert the kinetic energy of flowing gases or liquids into electrical energy by liberating electrons from field coils. Typically, in a wind turbine example, wind acting on propeller blades turn a gearbox that spins a motor. While effective, currently used configurations tend to lose energy through gearbox and bearing assemblies. In addition, any instabilities in the turbine can cause undo wear on its components and in extreme conditions the turbine must be dampened or frozen in place to protect it from damage. To capture energy, the generators tend to be large and complex.

Therefore, there is a need for a compact, self-stabilizing, and efficient turbine gyroscope design that converts a higher percentage of the energy from the flow of the propelling fluid to electrical energy than is afforded in current designs. This is accomplished by limiting mechanical losses and using a more efficient spoke/blade flywheel/rotor. Because the invention is a novel gyroscope design, the inherent stabilizing effects created by the gyroscope reduces the stresses put upon the invention and its supports/bearings allowing for the viability of magnetic type roller bearings. A more efficient and optimal spoke/blade design is accomplished through a method that allows for the transmutation of the cross section of the spokes/blades to expand or contract. The spokes/blades also have the ability to rotate about their center of pressure allowing the flywheel to capture more of the energy from the fluid passing over their surfaces in all conditions. The invention is more compact than current designs and can be more easily placed in or close to urban locations. As an example, the invention could be placed on the top of a high-rise building.

SUMMARY OF THE INVENTION

A friction limiting turbine gyroscope is assembled from a horizontally oriented gyroscope flywheel integrating aerodynamically shaped spokes that rotate the gyroscope when a gas/fluid flow over them. The spokes contain an inner spar that can expand or contract through the use of a flexible composites containing shaped memory alloys that alter their shape when an electrical current is introduced. In alternate embodiments, the inner spar could be made to expand by introducing compressed gases, or by electromechanical servomechanism. The blades have a flexible skin that that can expand or contract with the changes in the spar height and integrate shaped memory alloys to create the desired surface shape. The shape of the blades will adjust for changes in speed and density of the incoming propelling fluid. In addition, the spokes/blades are rotatable about their center of pressure through the actuation of a servomechanism. A central computer monitors the fluid changes to make the changes necessary to capture the most energy possible.

To convert the rotation of the flywheel to electrical energy, permanent magnets are integrated along its perimeter with proximately located field coils to convert the flywheel's ration to electrical energy. The mass of the permanent magnets also serves to amplify angular momentum of the flywheel creating stronger gyroscopic inertia. For optimal tuning of the turbine generator gyroscope, the distance between the field coils and the flywheel's permanent magnets can be altered to optimize energy generation in varied environmental conditions, for example, further away in low wind or closer in high wind. Because of the gyroscopic stabilizing effect, the invention can easily be supported by a magnetic bearing field eliminating mechanical stress and energy loss due to friction. In extremely low energy situations (for example, slow-moving wind), a portion of the field coils can be energized with phasing electricity to turn a portion of the generator into a motor. By energizing a small number of field coils, inertia can be conserved and create a net positive energy output.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The terminology used herein is for describing particular embodiments only and is not intended to be limiting for the invention. As used herein, the term "and/or" includes any and all combinations of one or more of the associated listed items. As used herein, the singular forms "a," "an" and "the" are intended to include the plural forms as well as the singular forms, unless the context clearly indicates otherwise. It will be further understood that the terms "comprises" and/or 'comprising' when used in this specification, specify the presence of stated features, steps, operations, elements, and/or components, but do not preclude the addition of one or more other features, steps, operations, elements, components, and/or groups thereof.

Unless otherwise defined, all terms used herein, including technical and scientific terms, have the same meaning as commonly understood by one having ordinary skill in the art to which the invention belongs. It will be further understood that terms, such as those defined in commonly used dictionaries, should be interpreted as having a meaning that is consistent with their meaning in the one context of the relevant art and the present disclosure and will not be interpreted in an idealized or overly formal sense unless expressly so defined, herein.

In describing the invention, it will be understood that several techniques and steps are disclosed. Each of these has individual benefit and each can also be used in conjunction with one or more (or in some cases all) of the other disclosed techniques. Accordingly, for the sake of clarity, this description will refrain from repeating every possible combination of the individual steps in an unnecessary fashion. Nevertheless, the specification and claims should be read with the understanding that such combination are entirely within the scope of the invention and the claims.

New friction limiting turbine generator gyroscope method and apparatus are discussed herein. In the following description, for the purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 1:
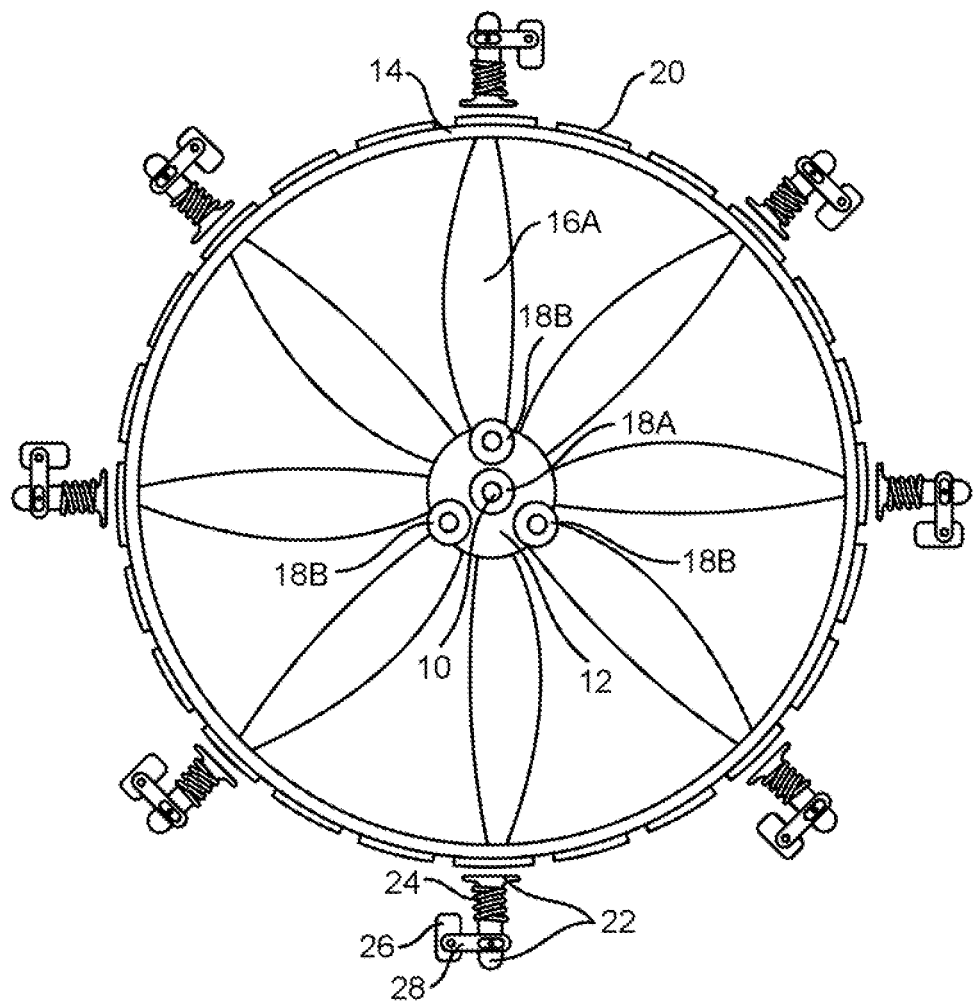
FIG. 1 shows the front view of a friction limiting turbine generator gyroscope of an embodiment of the present invention.

The present invention will now be described by referencing the appended figures representing preferred and alternative embodiments. FIG. 1 depicts a front view of elements that may comprise a new friction limiting turbine generator gyroscope device (the "device") according to various embodiments of the present invention. As shown with reference to FIGS. 1 and 2, in preferred embodiments, the general assembly front and side cross-section contains each of the elements of the device configured with at least one central gyroscope flywheel composed of a perimeter ring 14 with a central hub 12 and supported by axle and a plurality of rotatable spokes 16A, which may be made of lightweight composite, aluminum, or another suitable material. The peripheral ring 14 is configured to accept a plurality of permanent magnets 20 along the flywheel's exterior perimeter. The magnets can be glued in place with or without additional means to keep the magnets in place when the flywheel spins, not depicted in drawings.

In certain embodiments, a plurality of vertical protrusions separate a plurality of magnets to split the surface area of the gyroscope's perimeter equally. The magnets turn the flywheel into the armature of a turbine generator gyroscope. Magnets are acted upon by an external stator containing a plurality of stator fingers 22 wrapped by a plurality of field coils 24 to produce electricity. The field coils are individually connected to a plurality of voltage regulators allowing them to operate independent from each other. In low energy situations, for example low wind, phasing energy can be sent to a select number of field coils to maintain inertia creating net positive energy production. The fingers and field coils are preferably connected to a servomechanism 26 by a control arm 28 in such a manner that their distance from the magnets on the flywheel ring can be increased or reduced based upon the amount of energy passing through the spokes. If the flow is strong, the stator fingers are moved in closer; if the flow is weak, then the stator fingers are moved further out to lessen the drag on the gyroscope's flywheel magnets.

The central hub 12 is configured to accept a central axle 10 with end points 10A, 10B that limit unwanted horizontal movements of the invention because end points touch against the surrounding support structure, not shown. The axle is supported by a magnetic field generated by a plurality of permanent magnets 18A located on the axle with a plurality of countering permanent magnets locating in the inventions supporting structure18B. The magnetic fields on the axle's magnets oppose the magnetic fields in the supporting structures magnets causing the invention to float in a magnetic field. The ends of the axle serve to limit horizontal motion and precession caused by the gyroscope, allowing the invention to spin with very little friction. The flywheel creates gyroscopic inertia that limits the strain put on the magnetic bearing to increase its effectiveness at keeping the invention centered and balanced.

Figure 2:
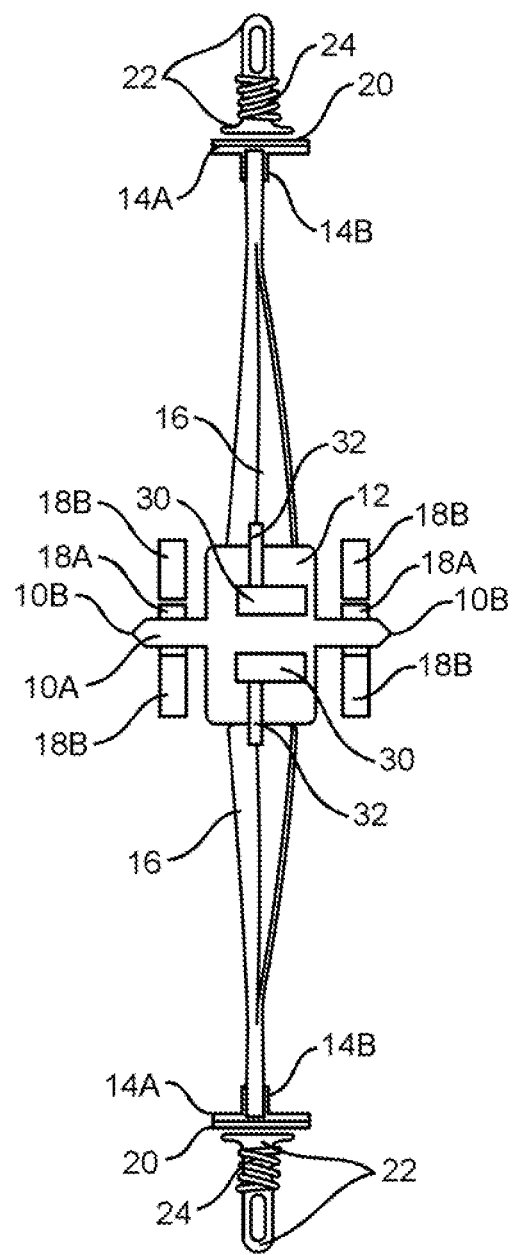
FIG. 2 shows a side cross section view of a friction limiting turbine generator gyroscope of an embodiment of the present invention.
Figure 3:
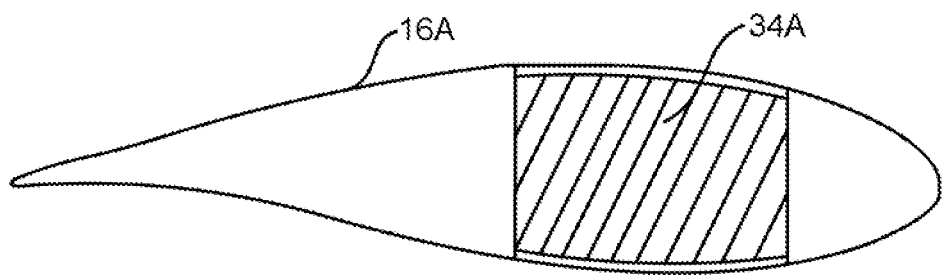
FIG. 3 shows a cross section of the flywheel blades with a small cross section with a contracted spar of an embodiment of the present invention.
Figure 4:
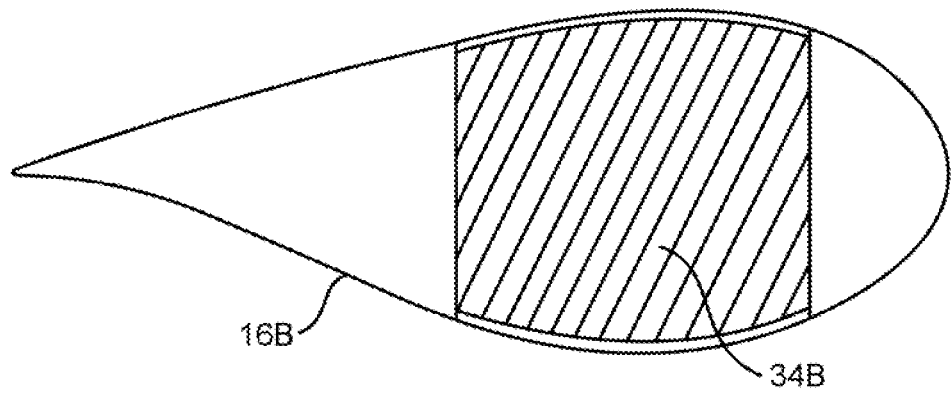
FIG. 4 presents a cross section of the flywheel blades with a large cross section with an expanded spar of an embodiment of the present invention.

As shown with reference to FIGS. 1-3, spokes/blades 16 are made from a composite material containing shaped memory alloys that when acted upon by an electrical current can change their shape. As shown with reference to FIGS. 3-4, a central spar 34A and 34B is also made from a composite that contains shaped memory alloys that allows the spar to change its shape from a thin cross section 34A to a thicker cross section 34B to take advantage of variable speeds and densities of the fluids that pass over the spokes/blades. The skin's shaped memory alloys work in conjunction with the spar to maintain the desired airfoil. A computer monitoring device constantly monitors the incoming fluid and adjusts the spokes/blade to extract the maximum amount energy possible from the moving fluids. As described with reference to FIG. 2, the blades are pivotably carried at both of its ends around a support shaft with bearing 14B receiving the outer support shaft with an additional bearing located in the hub, not shown, supporting the inner shaft.

At times when there is only slight movement in the fluid passing over the flywheel spokes/blades, phasing electrical current can be sent to a plurality of the stator fingers and field coils, which can be used to propel the flywheel to help maintain inertia. Only the minimum number of coils necessary to keep the flywheel spinning would be utilized. If there is no movement in propelling gases to rotate the flywheel then no field coils would be energized.

Figure 5:
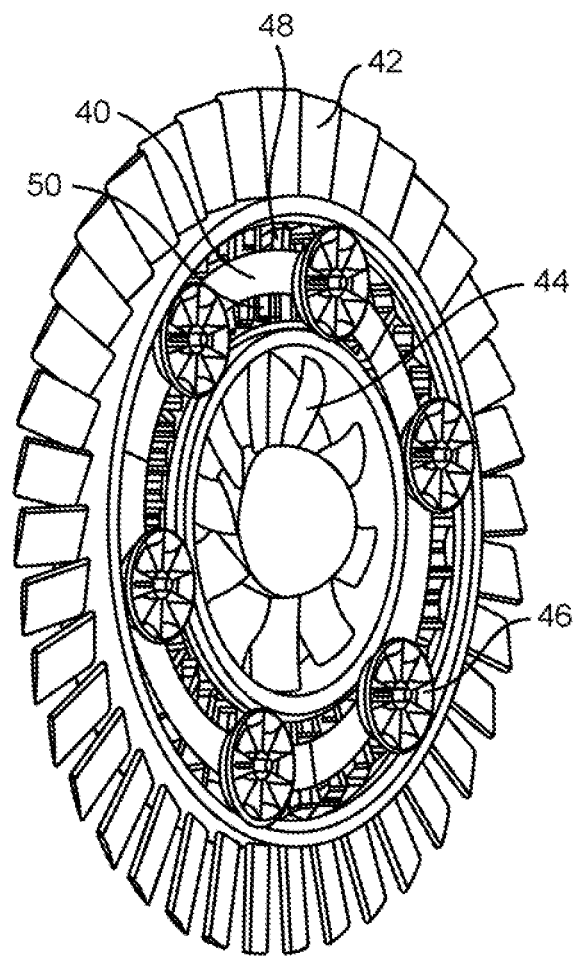
FIG. 5 illustrates a perspective view of a two-section flywheel of an alternate embodiment of an embodiment of the present invention.

As described with reference to FIG. 5, in an alternate embodiment, outer and inner flywheel sections 42, 44 move independently of each other either at different speeds or counter rotating if utilized in a fluid that moves in two directions, as an example but not limited to ocean tides. The two flywheel sections are separated by a stator section 40 with fingers wrapped in field coils 48, 50. The central hub contains a magnetic bearing system to support the device.

In an alternate embodiment, the magnetic bearing system used in the device is replaced with more conventional steel or ceramic roller bearings, not shown.

In an alternate embodiment, the gyroscope is hub less and supported by a system of bearings around its perimeter, not shown.

In an alternate embodiment, the flywheel spokes/blades have a fixed cross section and are constructed from carbon fiber, aluminum, or any suitable material.

In an alternate embodiment, the gyroscope exterior ring can be composed of segmented magnetic materials.

In an alternate embodiment, the blade is pivotably carried at one of its ends around a support shaft. The spokes/blades of the flywheel are constructed from or impregnated with permanent magnets. The outer ring maybe removed if desired.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. An electric energy creating turbine gyroscope, comprising:
    a plurality of blades mounted on a central rotatable hub, wherein the shape of each blade is configurable;
    a perimeter ring surrounding the tips of the plurality of blades and configured to rotate with said hub and said blades;
    a plurality of permanent magnets integrated into the perimeter ring;
    an enclosure surrounding the perimeter ring and integrated magnets, the enclosure including a plurality of field coils on a non-rotatable hub, wherein the distance between the plurality of field coils and the plurality of permanent magnets integrated into the perimeter ring is configurable; and
    a computer device configured to monitor and adjust the shape of the plurality of blades and the distance between the plurality of field coils and the plurality of permanent magnets integrated into the perimeter ring to maximize the extracted energy.

2. The gyroscope of claim 1, wherein each blade has a leading edge and a trailing edge defining a surface for receiving wind.

3. The gyroscope of claim 1, further comprising a nose cone covering the hub, which cone is configured to transfer an air mass approaching the gyroscope to be directed around the hub and into the plurality of blades.

4. The gyroscope of claim 1, wherein the magnets integrated in the magnetic ring stabilize the gyroscope.

5. The gyroscope of claim 1,
    wherein the central rotatable hub further comprises an axle having at least one axle magnet generating a magnetic field;
    the gyroscope interacts with a supporting structure having at least one supporting structure magnet generating a magnetic field,
    wherein the interaction between magnetic fields of the axel magnet and the structure magnet cause the central rotatably hub to float relative to the support structure.

6. The gyroscope of claim 1, wherein the shape of each blade is configurable by changing the cross section thickness of the blade.

* * * * *